United States Patent
Keller (10) Patent No.: US 10,679,603 B2
(45) Date of Patent: Jun. 9, 2020

(54) ACTIVE NOISE CANCELLATION IN WORK VEHICLES

(71) Applicant: CNH Industrial America LLC, New Holland, PA (US)

(72) Inventor: Nathaniel J. Keller, Harwood, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/032,179

(22) Filed: Jul. 11, 2018

(65) Prior Publication Data

US 2020/0020314 A1    Jan. 16, 2020

(51) Int. Cl.
*G10K 11/178* (2006.01)

(52) U.S. Cl.
CPC .. *G10K 11/17837* (2018.01); *G10K 11/17823* (2018.01); *B60Y 2200/22* (2013.01)

(58) Field of Classification Search
None
See application file for complete search history.

(56) References Cited

U.S. PATENT DOCUMENTS

| | | | |
|---|---|---|---|
| 5,097,923 A | 3/1992 | Ziegler et al. | |
| 5,850,458 A | 12/1998 | Tomisawa et al. | |
| 6,449,934 B1 | 9/2002 | Reimers et al. | |
| 8,135,140 B2 | 3/2012 | Shridhar et al. | |
| 8,249,259 B2 * | 8/2012 | Marumoto | H03G 3/32 381/104 |
| 9,076,424 B2 | 7/2015 | Mizuno | |
| 9,143,858 B2 | 9/2015 | Alves et al. | |
| 9,240,176 B2 | 1/2016 | Tzirkel-Hancock et al. | |
| 9,245,519 B2 | 1/2016 | Klug et al. | |
| 9,275,621 B2 | 3/2016 | Hamalainen | |
| 2005/0053244 A1 * | 3/2005 | Onishi | G10K 11/17883 381/71.11 |
| 2005/0060142 A1 * | 3/2005 | Visser | G10L 21/0208 704/201 |

(Continued)

OTHER PUBLICATIONS

Silentium, ARNC Automotive Case Study, 2018, 3 Pages. https://www.silentium.com/automotive-case-study-2/.

(Continued)

*Primary Examiner* — Qin Zhu
(74) *Attorney, Agent, or Firm* — Rickard K. DeMille; Rebecca L. Henkel (57) ABSTRACT

In one aspect, a system of active noise cancellation includes a signal processing apparatus in operative communication with at least one input device and at least one output device disposed within or proximate to a cabin of a work vehicle. Generally, the signal processing apparatus can be configured to perform a method of active noise cancellation. The method can include receiving an audio input signal from the at least one input device, the audio input signal comprising audio perceptible from within the cabin. The method can also include processing the audio input signal to separate ambient noise in the audio input signal from equipment noise in the audio input signal and generating an output waveform based on the ambient noise, and outputting the output waveform through the at least one audio output device. The output waveform can be configured to at least partially cancel out the ambient noise.

18 Claims, 5 Drawing Sheets

(56) References Cited

U.S. PATENT DOCUMENTS

| | | | |
|---|---|---|---|
| 2006/0285697 A1 | 12/2006 | Nishikawa et al. | |
| 2009/0058633 A1 | 3/2009 | Luo et al. | |
| 2009/0177354 A1* | 7/2009 | Agrawal | G01M 17/007 701/33.4 |
| 2011/0249826 A1* | 10/2011 | Van Leest | G10K 11/178 381/71.8 |
| 2011/0249829 A1* | 10/2011 | Mah | B60R 13/08 381/86 |
| 2014/0278398 A1* | 9/2014 | Fan | G10L 15/20 704/233 |
| 2014/0369515 A1 | 12/2014 | Trammell | |
| 2015/0055794 A1* | 2/2015 | Sanchez | H04R 3/00 381/86 |
| 2016/0049161 A1* | 2/2016 | Tsujikawa | H04R 3/005 381/94.7 |
| 2016/0205472 A1* | 7/2016 | Violi | G10K 15/02 381/86 |
| 2017/0133001 A1* | 5/2017 | Kim | G01S 19/13 |
| 2017/0133003 A1 | 5/2017 | Nicolai et al. | |
| 2017/0148428 A1 | 5/2017 | Thuy et al. | |
| 2017/0234180 A1 | 8/2017 | Petley et al. | |
| 2017/0294182 A1* | 10/2017 | Buganza | G10K 11/17883 |
| 2018/0211647 A1* | 7/2018 | Tani | G10K 11/17821 |
| 2018/0277090 A1* | 9/2018 | Christoph | G10K 11/17825 |

OTHER PUBLICATIONS

Saeed et al., Targeted Noise Cancellation System, Jul. 12, 2015. (Video) https://www.youtube.com/watch?v=XNkerG_jy9o https://youtu.be/XNkerG_jy9o.

* cited by examiner

ACTIVE NOISE CANCELLATION IN WORK VEHICLES

FIELD OF THE INVENTION

The present subject matter relates generally to systems and methods for active noise cancellation and, more particularly, to a system and method for active noise cancellation in work vehicles with selective noise pass-through features.

BACKGROUND OF THE INVENTION

Current work vehicles, such as tractors and other agricultural vehicles, include an engine, transmission, hydraulic systems, and other similar equipment. In many instances, an operator may operate the work vehicle while listening to a variety of noise sources both internal and external to the work vehicle. For example, an operator may listen to hydraulic whines, engine fluttering, exhaust notes, and tread noise from operation of the work vehicle.

In current work vehicles, operators may wear hearing protection, such as noise-isolating headphones, ear plugs, and other devices. Unfortunately, such devices indiscriminately muffle or dampen all sounds. It follows then, that if an operator must be actively considering equipment noise to assess the operability of the vehicle, the indiscriminate dampening of all sounds may lead to an operator being unable to hear noises or sounds associated with an equipment malfunction. Similarly, if an operator needs to hear voice commands or other signals from other people, sirens, alarms, etc., the indiscriminate dampening of all sounds may lead to an operator missing an important audio signal.

Accordingly, a system and method for active noise cancellation in work vehicles with selective noise pass-through features would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system of active noise cancellation in work vehicles. The system can include at least one input device disposed within or proximate to a cabin of a work vehicle, at least one audio output device disposed within or proximate to the cabin of the work vehicle, and a signal processing apparatus in operative communication with the at least one input device and the at least one output device. According to this aspect, the signal processing apparatus configured to perform a method of active noise cancellation. The method can include receiving an audio input signal from the at least one input device. The audio input signal can include audio perceptible from within the cabin. The method can also include processing the audio input signal to separate ambient noise in the audio input signal from equipment noise in the audio input signal, generating an output waveform based on the ambient noise, and outputting the output waveform through the at least one audio output device. Generally, the output waveform is configured to at least partially cancel out the ambient noise.

In another aspect, the present subject matter is directed to a method of active noise cancellation in work vehicles. The method can include receiving an audio input signal from the at least one input device, where the audio input signal can include audio perceptible from within the cabin. The method can also include processing the audio input signal to separate ambient noise in the audio input signal from equipment noise in the audio input signal and generating an output waveform based on the ambient noise. In this aspect, the output waveform can be configured to at least partially cancel out the ambient noise. The method also includes outputting the output waveform through the at least one audio output device In yet another aspect, the present subject matter is directed to a system of active noise cancellation in work vehicles. The system can include at least one input device disposed within or proximal to a cabin of a work vehicle, at least one audio output device disposed within or proximal to the cabin of the work vehicle, and a signal processing apparatus in operative communication with the at least one input device and the at least one output device. The signal processing apparatus can be configured to perform a method of active noise cancellation. The method can include receiving a first audio input signal from the at least one input device, where the first audio input signal includes ambient noise perceptible from within the cabin. The method can also include processing the first audio input signal to create a first audio waveform, where the first audio waveform is of substantially the same amplitude as the first audio input signal and 180 degrees out-of-phase from the first audio input signal. The method can further include receiving a second audio input signal and processing the second audio input signal and the first audio waveform to create a second audio waveform. The second audio waveform can include the first audio waveform and the second audio input signal. The method can also include outputting the second audio waveform through the at least one audio output device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for active noise cancellation in work vehicles with selective noise pass-through features. The active noise cancellation may increase the comfort in operating work vehicles. Additionally, the selective noise pass-through features may increase safety as compared to complete noise isolation systems, such as noise-isolating ear protection or conventional noise cancellation technology. The system and method for active noise cancellation may allow an operator of a work vehicle to comfortably operate the work vehicle while still being able to hear vehicle noise, equipment noise, and other noise associated with faulty equipment. Furthermore, the system and method for active noise cancellation may allow the operator of the work vehicle to hear targeted audio, voice commands and other audio targeted specifically for a particular work vehicle or operator, such as operating instructions, training instructions, two-way communications, and/or other suitable audio.

Specifically, a system of active noise cancellation in work vehicles can generally include an input device, such as a microphone, an output device, such as a speaker, as well as a signal processing apparatus. The microphone and/or speaker may be relatively simple devices configured to receive and transmit audio waveforms, respectively. The signal processing apparatus may be a general or specialized computer apparatus configured to process signals, perform filtering, perform isolation of one or more waveforms or target frequencies, and generate new waveforms. The processed signals may be received from the microphone while the new waveforms generated may be output through the speaker.

In general, the signal processing apparatus may receive an audio input signal from the microphone, such as audio being received within the cabin of the work vehicle. The audio may include a variety of noise from a variety of noise sources. For example, the audio may include engine noise, drivetrain noise, hydraulic noise, and/or other noise. The audio may also include voices of one or more other operators external to the work vehicle, such as field workers or other individuals.

The signal processing apparatus may then process the audio input to separate ambient noise in the audio input signal from other noise in the audio input signal, such as equipment noise. For example, the ambient noise may include noise associated with properly functioning equipment, such as engine idling, engine acceleration, hydraulic pump noise, smooth drivetrain operation, tire tread noise, and other ambient noise. In contrast, the equipment noise may include noise associated with faulty equipment, failing equipment, and/or other otherwise different noises not associated with properly functioning equipment. For example, noise from faulty equipment can include gear grinding, excessive tire tread noise, faulty pump whines, rough engine idling/acceleration, rough drivetrain noise, insufficient lubrication noise, faulty combine rake or shift noise, and any other suitable noise associated with faulty or failing equipment.

The signal processing apparatus may then generate an output waveform based on the ambient noise alone, or the ambient noise and a reduced form of the faulty equipment noise. In one embodiment, the output waveform would be of substantially the same amplitude as the ambient noise and 180 degrees out-of-phase from the ambient noise, and would be output through the output device. In this manner, ambient noise may be cancelled while faulty equipment noise may be passed through. Additionally, faulty equipment noise may be slightly attenuated in a similar manner as to the noise cancellation of the ambient noise. For example, a waveform 180 degrees out-of-phase with the faulty equipment noise but of a different amplitude may be output as well. In this manner, an operator may still be able to safely perceive faulty equipment while having ambient noise reduced to tolerable or comfortable levels.

In other aspects, the separation of the ambient noise from the faulty equipment noise may be achieved through filtering, such as through use of Fourier analysis and filtering, through isolation of target frequencies, through isolation of particular frequency components, and through any other suitable manner of separating ambient noise from faulty equipment noise.

Figure 1:
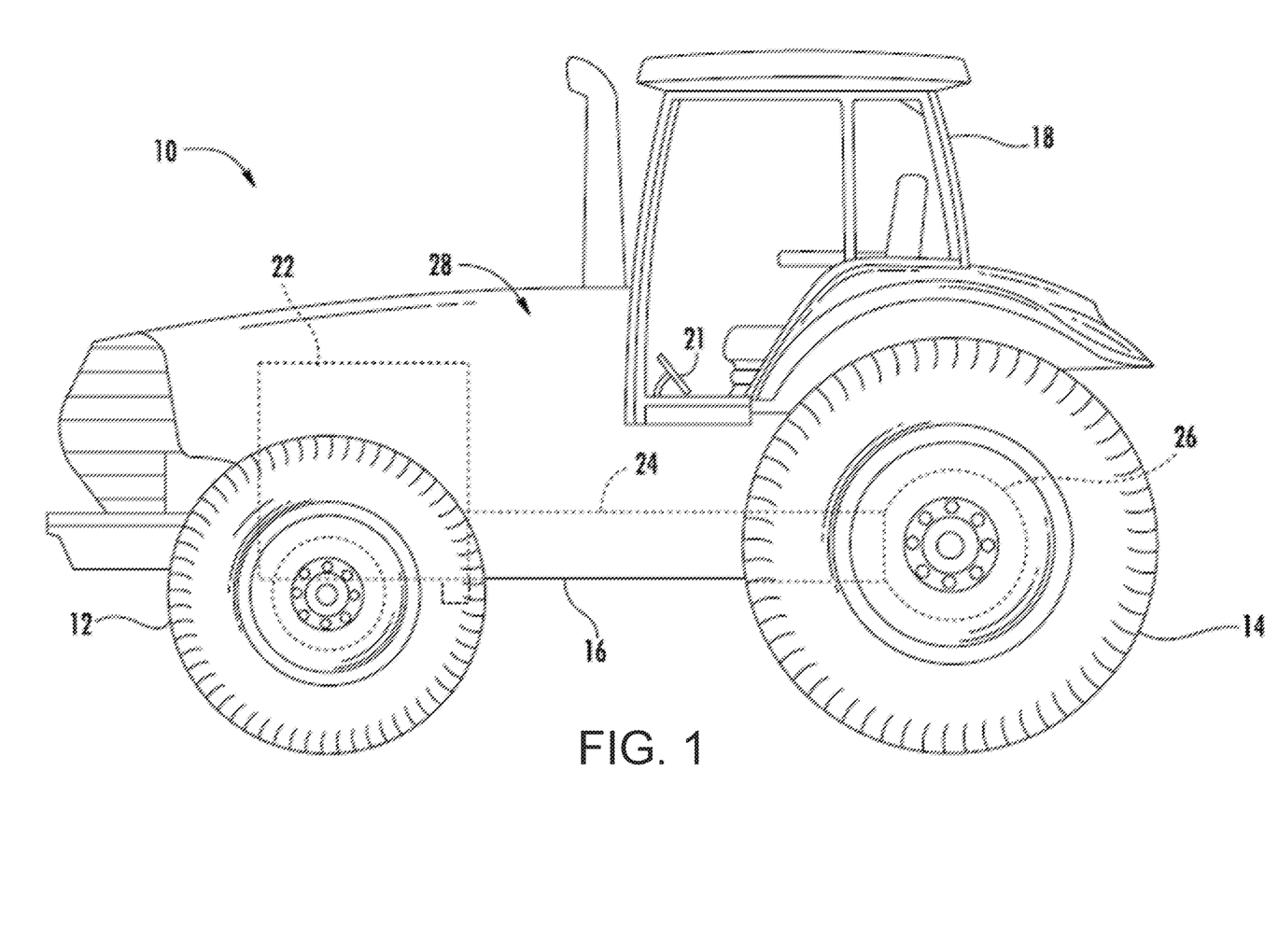
FIG. 1 illustrates a side view of one embodiment of a work vehicle in accordance with aspects of the present subject matter.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels and associated tires 12, a pair or rear wheels and associated tires 14, and a chassis 16 coupled to and supported by the wheels/tires 12, 14. An operator's cab or cabin 18 may be supported by a portion of the chassis 16 and may house various input devices, such as a control lever 20 and/or a foot pedal 21, for permitting an operator to control the operation of the work vehicle 10. One or more of the input devices may be used to allow the operator to provide an operating command to an associated controller of the work vehicle 10 that indicates desired operation for the vehicle 10. Additionally, the work vehicle 10 may include an engine 22 and a transmission 24 mounted on the chassis 16. The transmission 24 may be operably coupled to the engine 22 and may provide variably adjustable gear ratios for transferring engine power to the wheels via a drive axle assembly 26. The engine 22, transmission 24, and drive axle assembly 26 may collectively define a drive train 28 of the work vehicle 10. Furthermore, although not particularly illustrated, it is understood that the work vehicle 10 may further include auxiliary pumps, such as hydraulic pumps, power shaft outputs, external couplings, and several other optional components for utilizing the work vehicle 10 for a variety of agricultural tasks.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and drive axle assembly 26 are coupled, a configuration common in smaller tractors. Still other configurations may use an articulated chassis to steer the work vehicle 10, or rely on tracks in lieu of the wheels/tires 12, 14. Additionally, although not shown, the work vehicle 10 may also be configured to be operably coupled to any suitable type of work implement, such as a trailer, spray boom, manure tank, feed grinder, plow, seeder, planter, tillage implement, and/or the like.

Figure 2:
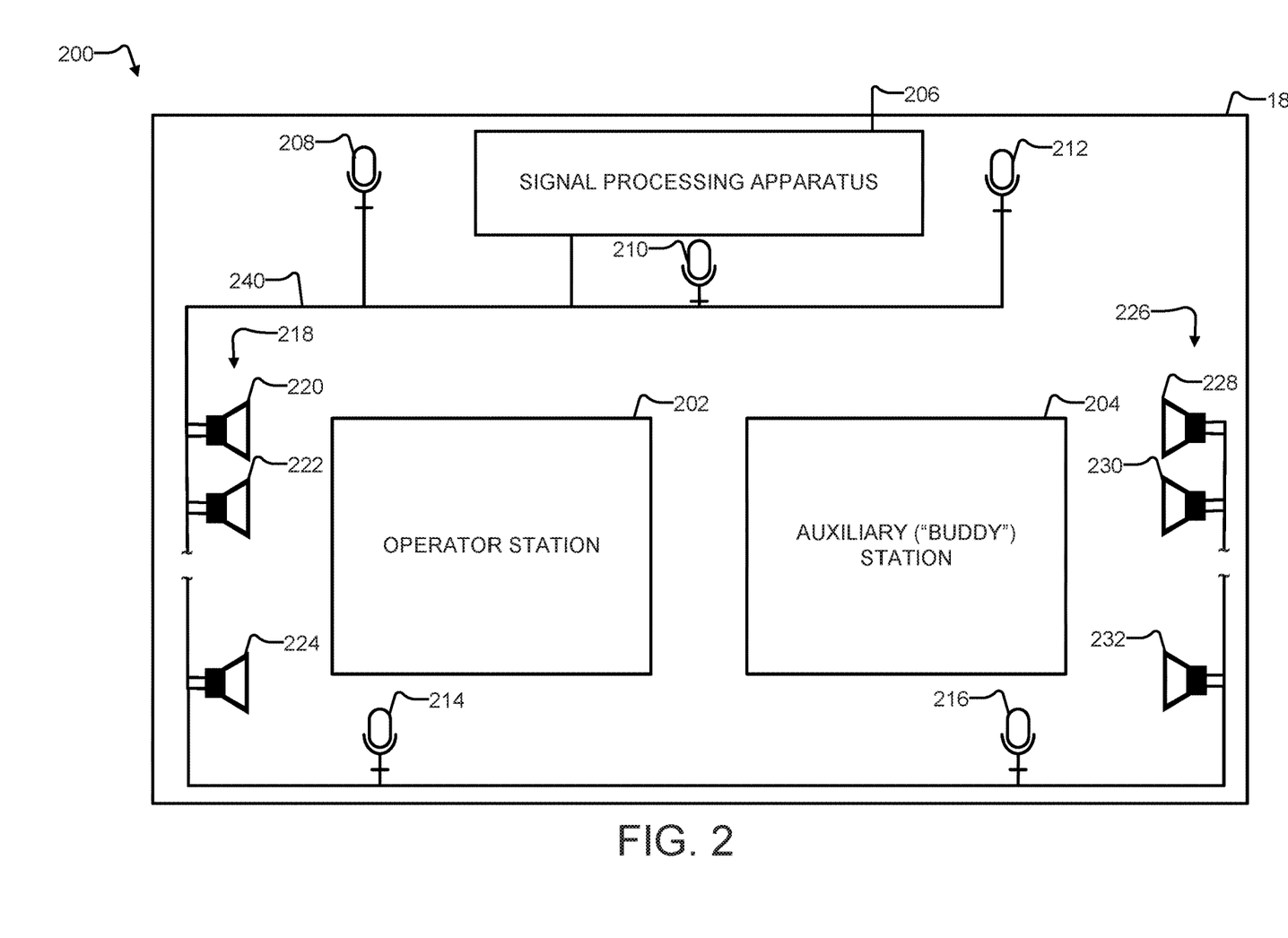
FIG. 2 illustrates a schematic view of one embodiment of an active noise cancellation system installed within a work vehicle in accordance with aspects of the present subject matter.

Referring now to FIG. 2, a schematic view of one embodiment of an active noise cancellation system 200 configured for use within a work vehicle 10 is illustrated in accordance with aspects of the present subject matter. Generally, the system 200 may be disposed proximate to or within the cabin 18 of the work vehicle 10. In several embodiments, the system 200 can include a signal processing apparatus 206, at least one input device 208, and at least one output device 220. Generally, the input device 208 and the output device 220 may be in operative communication with the signal processing apparatus 206 over communications interface 240.

As shown in the illustrated embodiment, the system 200 may include a plurality of input devices 208, 210, 212, 214, and 216 disposed within the cabin 18. It should be understood that any particular number of input devices may be used depending upon any desired implementation, and thus the particular number illustrated is not limiting of all aspects of this disclosure. The input devices may include a microphone. The microphone may be a general purpose microphone, a directional microphone, an omnidirectional microphone, or any other suitable microphone device configured to receive audio and transmit audio to the signal processing apparatus 206.

As further shown in the illustrated embodiment, the system 200 may also include a plurality of output devices 220, 222, 224, 228, 230, and 232 disposed proximate or within the cabin 18. It should be understood that any particular number of output devices may be used depending upon any desired implementation, and thus the particular number illustrated is not limiting of all aspects of this disclosure. The output devices may include a speaker. The speaker may be a general purpose or special purpose speaker. Furthermore, the speakers can include multiple components, including multiple individual speakers (e.g., tweeters, midrange, low range, woofer, etc.), bandpass filters or crossover components, and/or any other suitable components to enable rich and desirable sound and output waveform reproduction.

In one embodiment, the speakers may be arranged in one or more speaker arrays 218, 226. The speaker arrays 218, 226 may be arranged to beamform output waveforms towards an operator station 202 and/or an auxiliary station (e.g., "Buddy Station") 204. The beamforming may include varying amplitudes of output waveforms at individual speakers of the arrays 218, 226 to create a cloud or three-dimensional area saturated with a desired output waveform. The beamforming may facilitate better active noise cancellation in some aspects. However, it is readily understood that an output waveform reproduced at a single output speaker may also significantly cancel noise. Accordingly, although multiple speakers are illustrated, all aspects of this disclosure are not limited to multiple speakers, and aspects utilizing a single speaker are also applicable.

As described briefly above, the signal processing apparatus 206 may receive an audio input signal from one or more input devices, process the audio input signal, and create an output audio waveform for playback at one or more of the speakers. Hereinafter, a more detailed discussion of the operation of the system 200 and the signal processing apparatus 206 is provided with reference to FIG. 3 and FIG. 4.

Figure 3:
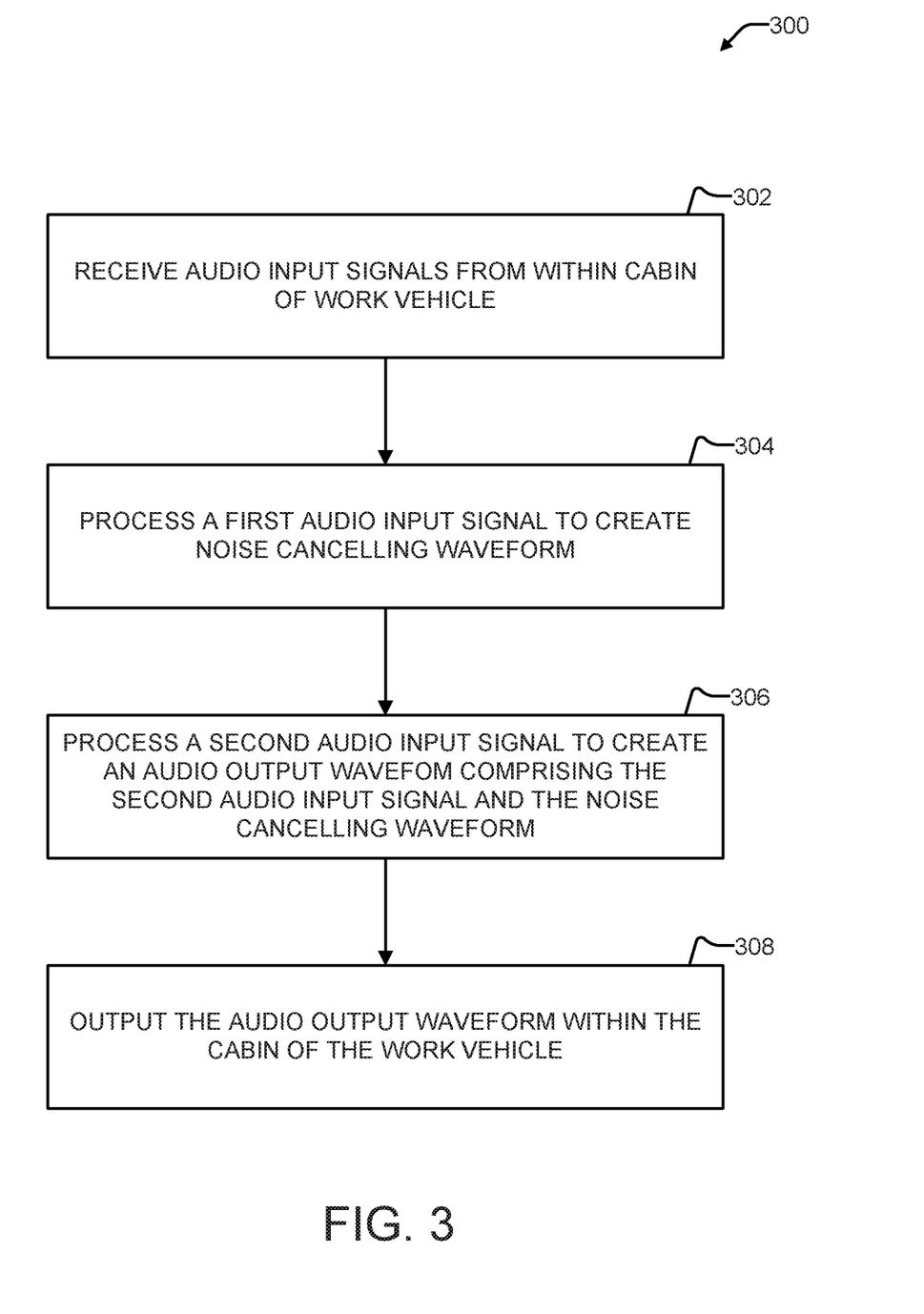
FIG. 3 illustrates a flow diagram of one embodiment of a method of active noise cancellation in a work vehicle in accordance with aspects of the present subject matter.

FIG. 3 illustrates a flow diagram of one embodiment of a method 300 of active noise cancellation in a work vehicle in accordance with aspects of the present subject matter. As illustrated, the method 300 may be implemented by a general or specialized computer apparatus, such as the signal processing apparatus 206. The method 300 may include receiving audio input signals from within the cabin 18 of a work vehicle 10, at block 302. Specifically, in several embodiments, the method 300 may include receiving a first audio input signal from at least one input device 208 disposed within or proximate to the cabin 18 and receiving a second audio input signal from the input device(s) 208 or another input device disposed within or proximate to the cabin 18. In one embodiment, the first audio input signal can comprise ambient noise from within the cabin 18, ambient noise external to the cabin 18 that is perceptible within the cabin 18, and/or other ambient noise. Additionally, in one embodiment, the second audio input signal may include commands from a training professional or another person seated in the auxiliary station 204 or external to the cabin 18.

The method 300 may also include processing the first audio input signal to create a first audio waveform, at block 304. In one embodiment, the first audio waveform should be of substantially the same amplitude as the first audio input signal and 180 degrees out-of-phase from the first audio input signal. In this manner, the first audio waveform can actively cancel the first audio input signal.

The method 300 may also include processing the second audio input signal and the first audio waveform to create a second audio waveform, at block 306. The second audio waveform can include the first audio waveform and the second audio input signal. Thus, while the first audio waveform can actively cancel the first audio input signal (e.g., the ambient noise), the second audio waveform also includes the second audio signal, thereby allowing selective pass-through of audio information to an operator of the work vehicle 10.

The method 300 may further include outputting the second audio waveform through at least one audio output device disposed within or proximate to the vehicle's cabin, at block 308. The outputting may also include beamforming the second audio waveform through one or more speaker arrays 218, 226. Additionally, the outputting may include playback of the second audio waveform from one or more of the speakers 220, 222, 224, 228, 230, 232. Other output profiles may also be desirable, including output into an audio headset (not illustrated) or speakers mounted on protective headgear.

As described above, the system 200 may operate to actively cancel ambient noise within the cabin 18 while also selectively passing through a second audio input signal to an operator of the work vehicle 10. However, other functions are also appropriate. For example, intelligent filtering, sampling, isolation, and selectively passing through audio are also applicable in some aspects.

Figure 4:
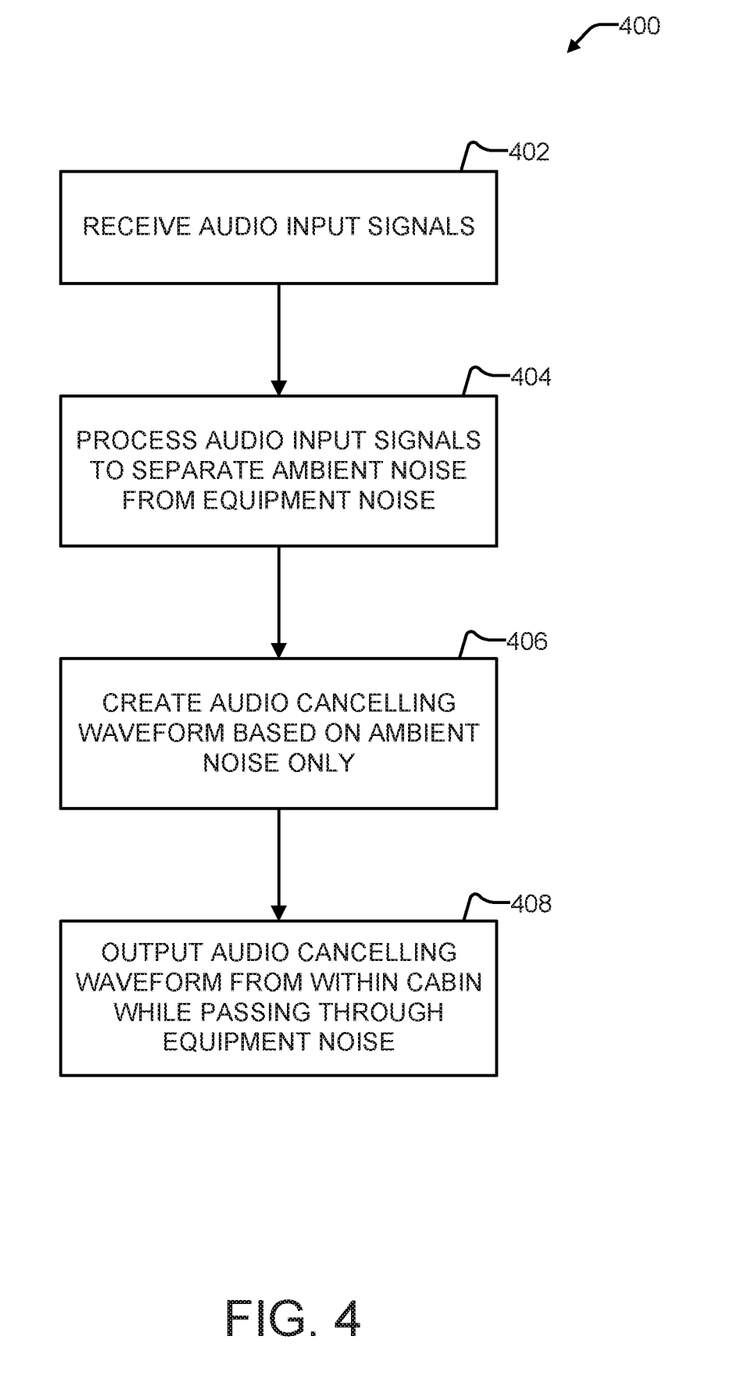
FIG. 4 illustrates a flow diagram of another embodiment of a method of active noise cancellation in a work vehicle in accordance with aspects of the present subject matter.

FIG. 4 illustrates a flow diagram of a method 400 of active noise cancellation in a work vehicle 10 in accordance with aspects of the present subject matter. As illustrated, the method 400 may be implemented by a general or specialized computer apparatus, such as the signal processing apparatus 206. The method 400 can include receiving audio input signals from at least one input device 208, at block 402. The audio input signals can include, for example, audio from within the cabin, as well as audio external to the cabin 18 that is perceptible within the cabin 18.

The method 400 can also include processing the audio input signals to separate ambient noise within the audio input signals from equipment noise within the audio input signals, at block 404. Generally, the signal processing apparatus 206 may filter out frequency components associated with the equipment noise to create a filtered waveform comprising the ambient noise. Thus, the processed/filtered waveform includes only ambient noise, or in some cases mostly ambient noise with a portion of faulty equipment noise.

The method 400 can also include generating an output waveform based on the filtered waveform and/or simply the ambient noise, at block 406. The output waveform should be of substantially the same amplitude as the filtered waveform or the ambient noise and 180 degrees out-of-phase from the ambient noise.

The method 400 may further include outputting the output waveform through at least one audio output device 220, at block 408. The outputting may also include beamforming the output audio waveform through one or more speaker arrays 218, 226. Additionally, the outputting may include playback of the output audio waveform from one or more of the speakers 220, 222, 224, 228, 230, 232. Other output profiles may also be desirable, including output into an audio headset (not illustrated) or speakers mounted on protective headgear.

Generally, as described above with reference to FIG. 4, the signal processing apparatus 206 may filter out frequency components associated with the equipment noise to create a filtered waveform comprising the ambient noise. In this manner, an output waveform can include a waveform of substantially the same amplitude as the filtered waveform and 180 degrees out-of-phase from the filtered waveform. However, a portion of the filtered equipment noise may be cancelled as well. In this manner, an attenuated portion of the faulty equipment noise can be perceptible to the operator. It is understood then, that the filtered waveform further can include noise associated with properly functioning equipment, ambient noise, and an attenuated portion of faulty or failing equipment noise.

It is noted that filtering out frequency components associated with the equipment noise can include applying a filter based on known frequency components of faulty equipment, such as a Fourier filter or other filter, and/or can include other filtering techniques. In this manner, the signal processing apparatus 206 can filter out substantially all frequency components associated with faulty equipment, a portion of the frequency components associated with faulty equipment, and/or other frequency components. For example, the filtering can remove all but one frequency component associated with faulty equipment. In this example, the system 200 can actively cancel virtually all noise except for a portion of a frequency (e.g., such as a high-pitched whine readily identifiable as a faulty piece of equipment) for an operator of the work vehicle 10.

Furthermore, it is readily understood that the above-described methods 300, 400 of FIGS. 3 and 4 can be at least partially combined. For example, the method 400 of FIG. 4 can include one or more of the features of the method 300 of FIG. 3, such that a second audio input signal can be injected or combined with the output audio waveform such that an operator can receive voice commands as well as actively perceive faulty equipment noises, all while having active noise cancellation of ambient noise.

As described above, a plurality of systems and methods for active noise cancellation in work vehicles with selective noise pass-through features have been described. The systems and methods may be facilitated through an input device, an output device, and a signal processing apparatus. The signal processing apparatus may be a general or specialized computer apparatus configured to perform various signal processing functions.

Figure 5:
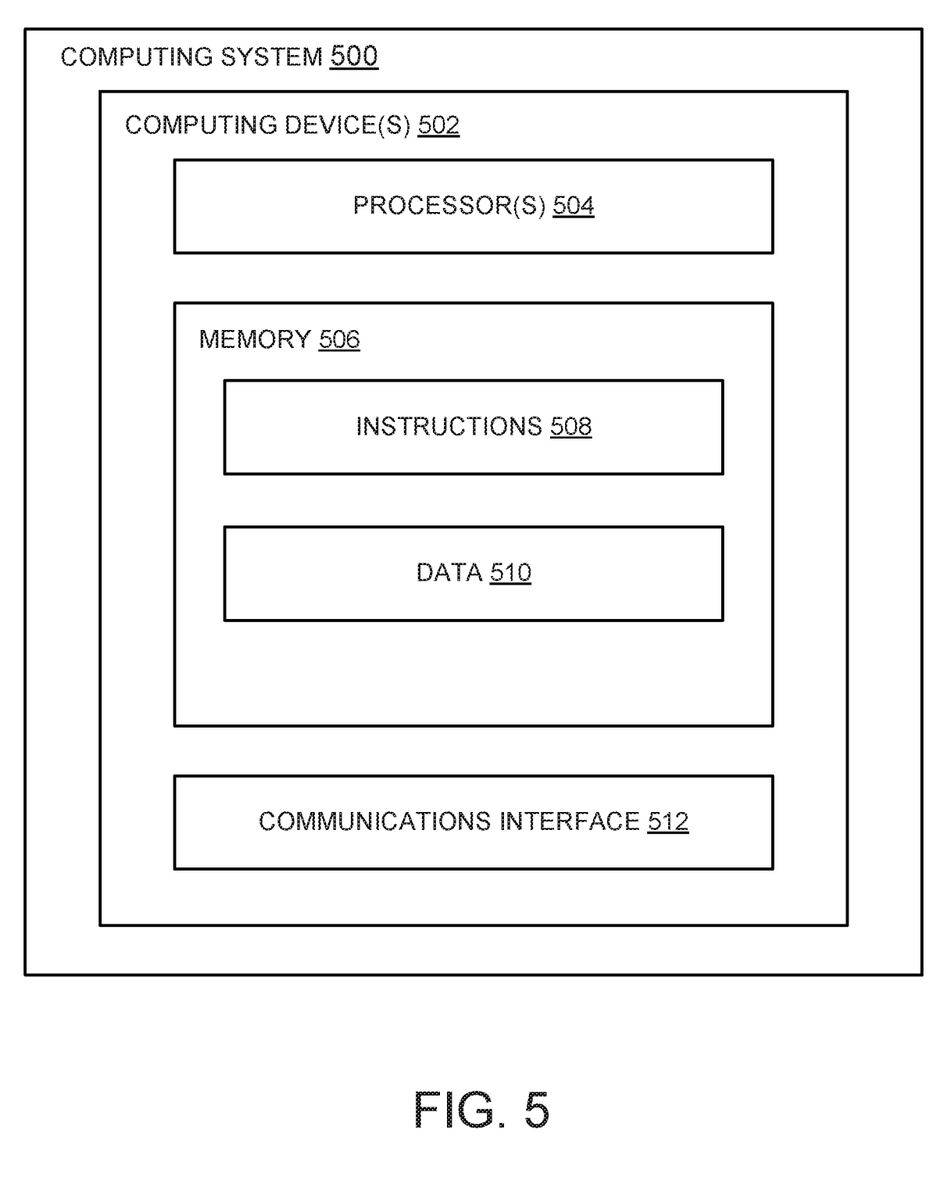
FIG. 5 illustrates a block diagram of an example computing system that can be used to implement one or more of the methods and/or systems described herein in accordance with aspects of the present subject matter.

For example, FIG. 5 depicts a block diagram of an example computing system 500 that can be used to implement one or more components of the system 200 or other systems according to example embodiments of the present disclosure. As shown, the computing system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for active noise cancellation with selective pass-through features, as described with reference to FIG. 3 and/or with reference to FIG. 4.

The memory device(s) 506 can further store data 510 that can be accessed by the processors 504. For example, the data 510 can include example waveforms or frequency components of faulty or failing equipment, example waveforms or frequency components of properly functioning equipment, and other suitable data, as described herein. The data 510 can include one or more table(s), function(s), algorithm(s), model(s), equation(s), etc. for determining appropriate faulty equipment noise to selectively pass-through while actively cancelling other ambient noise according to example embodiments of the present disclosure.

The one or more computing device(s) 502 can also include a communication interface 512 used to communicate, for example, with the other components of the system and/or other computing devices. The communication interface 512 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system of active noise cancellation in work vehicles, the system comprising:
    at least one input device disposed within or proximate to a cabin of a work vehicle;
    at least one audio output device disposed within or proximate to the cabin of the work vehicle; and
    a signal processing apparatus in operative communication with the at least one input device and the at least one output device, the signal processing apparatus configured to perform a method of active noise cancellation comprising:
        receiving an audio input signal from the at least one input device, the audio input signal comprising audio perceptible from within the cabin;
        processing the audio input signal to separate ambient noise in the audio input signal from equipment noise in the audio input signal, the equipment noise comprising noise generated external to the cabin of the work vehicle by faulty equipment associated with the work vehicle;
        generating an output waveform based on the ambient noise, the output waveform being configured to at least partially cancel out the ambient noise; and
        outputting the output waveform through the at least one audio output device.

2. The system of claim 1, wherein:
    processing the audio input signal comprises filtering out frequency components associated with the equipment noise to create a filtered waveform comprising the ambient noise; and
    generating the output waveform comprises generating a waveform of the same amplitude as the filtered waveform and 180 degrees out of phase from the filtered waveform.

3. The system of claim 2, wherein the filtered waveform further comprises noise associated with properly functioning equipment.

4. The system of claim 2, wherein filtering out frequency components associated with the equipment noise comprises applying a filter based on known frequency components of faulty equipment.

5. The system of claim 2, wherein filtering out frequency components comprises filtering out all frequency components associated with faulty equipment.

6. The system of claim 1, wherein the output waveform is a first output waveform and wherein the signal processing apparatus is further configured to:
    receive a second audio input signal;
    process the second audio input signal and the first output waveform to create a second output waveform, the second output waveform comprising the first output waveform and the second audio input signal; and
    outputting the second output waveform through the at least one audio output device.

7. The system of claim 1, wherein the at least one input device comprises one or more microphones disposed within or proximate to the cabin of the work vehicle and wherein the at least one audio output device is a speaker disposed within or proximate to the cabin of the work vehicle.

8. The system of claim 1, wherein the output waveform is of the same amplitude as the ambient noise and 180 degrees out-of-phase from the ambient noise.

9. A method of active noise cancellation in work vehicles, the method comprising:
    receiving an audio input signal from at least one input device, the audio input signal comprising audio perceptible from within a cabin;
    processing the audio input signal to separate ambient noise in the audio input signal from equipment noise in the audio input signal, the equipment noise comprising noise generated external to the cabin by faulty equipment associated with the work vehicle;
    generating an output waveform based on the ambient noise, the output waveform being configured to at least partially cancel out the ambient noise; and
    outputting the output waveform through at least one audio output device.

10. The method of claim 9, wherein:
    processing the audio input signal comprises filtering out frequency components associated with the equipment noise to create a filtered waveform comprising the ambient noise; and
    generating the output waveform comprises generating a waveform of the same amplitude as the filtered waveform and 180 degrees out of phase from the filtered waveform.

11. The method of claim 10, wherein the filtered waveform further comprises noise associated with properly functioning equipment.

12. The method of claim 10, wherein filtering out frequency components associated with the equipment noise comprises applying a filter based on known frequency components of faulty equipment.

13. The method of claim 9, wherein the output waveform is of the same amplitude as the ambient noise and 180 degrees out-of-phase from the ambient noise.

14. The method of claim 9, wherein the at least one input device is one or more microphones disposed proximate an operator station of the work vehicle.

15. The method of claim 14, wherein the at least one input device further comprises one or more microphones disposed proximate an auxiliary station of the work vehicle.

16. The method of claim 9, wherein the at least one audio output device comprises:
    an array of speakers configured to generate sound relative to an operator station of the work vehicle.

17. The system of claim 2, wherein the filtered waveform further comprises an attenuated portion of the equipment noise, the attenuated portion of the equipment noise having a different amplitude than the equipment noise.

18. The method of claim 10, wherein the filtered waveform further comprises an attenuated portion of the equipment noise, the attenuated portion of the equipment noise having a different amplitude than the equipment noise.

* * * * *